US008214249B2

(12) United States Patent
King

(10) Patent No.: US 8,214,249 B2
(45) Date of Patent: Jul. 3, 2012

(54) RESOURCE PLANNING SYSTEM WITH CARBON EMISSION INPUT

(75) Inventor: Nigel King, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1059 days.

(21) Appl. No.: 12/135,767

(22) Filed: Jun. 9, 2008

(65) Prior Publication Data

US 2009/0307037 A1 Dec. 10, 2009

(51) Int. Cl.
*G06Q 10/00* (2012.01)
(52) U.S. Cl. ......... 705/7.37; 700/99; 700/100; 705/7.22
(58) Field of Classification Search .................... 700/99, 700/100; 705/7.22, 7.37
See application file for complete search history.

(56) References Cited

U.S. PATENT DOCUMENTS

| | | | | |
|---|---|---|---|---|
| 5,089,970 | A * | 2/1992 | Lee et al. | 700/96 |
| 5,233,533 | A * | 8/1993 | Edstrom et al. | 700/103 |
| 7,580,766 | B1 * | 8/2009 | Sharma et al. | 700/100 |
| 2002/0165744 | A1 * | 11/2002 | Juras et al. | 705/7 |
| 2003/0229572 | A1 * | 12/2003 | Raines et al. | 705/37 |
| 2004/0088179 | A1 * | 5/2004 | Cogen et al. | 705/1 |
| 2005/0228759 | A1 | 10/2005 | King | |
| 2007/0156495 | A1 | 7/2007 | King | |
| 2008/0040182 | A1 * | 2/2008 | Wegner et al. | 705/8 |
| 2008/0183519 | A1 | 7/2008 | King et al. | |
| 2009/0132320 | A1 * | 5/2009 | Saeed | 705/8 |
| 2009/0177505 | A1 * | 7/2009 | Dietrich et al. | 705/7 |

OTHER PUBLICATIONS

Emissions Warranties for 1995 and Newer Cars & Trucks, EPA420-F-96-020, United States Environmental Protection Agency, Mar. 1996, p. 1-10.*
Frosch and Gallopoulos, Strategies for Manufacturing, Scientific American, Sep. 1989, p. 144-52.*
Pauwels, The City of Edinbugh Council-Carbon Management Programme: Strategy and Implementation Plan, Mar. 15, 2008, p. 1-51.*
Martin et al., Company Fleet Management—an environmentally friendly approach, Mar. 2007, p. 1-42.*
Transport for London—Fuel and fleet management guide, Oct. 2006, p. 1-24.*
Kraft, Incorporate Environmental Reviews into Facility Design, Chemical Engineering Progress, Aug. 1992, p. 46-52.*
Keys to Green: Enterprise, National, Alamo—Our Comprehensive Environmental Platform, keystogreen.com, retrieved from web.archive.org, May 2, 2008, p. 1-7.*
Wright, Northampton Borough Council Strategy and Implementation Plan, Local Authority Carbon Management Programme, Mar. 3, 2008, p. 1-61.*
Ing, Porsche and the Environment, Oct. 2007, p. 4-35.*
Chicago Climate Exchange, Inc., "The World's First and North America's Only Greenhouse Gas Emissions Registry, Reduction and Trading System, with Offsets Worldwide", May 2008.
Chicago Climate Exhange, Inc., "Trading Carbon Financial Instrument Contracts on CCX and CCFE: Cash, Futures and Options", Jun. 2008.

* cited by examiner

*Primary Examiner* — Justin M Pats
(74) *Attorney, Agent, or Firm* — Squire Sanders (US) LLP

(57) ABSTRACT

Embodiments of systems, methods, and software associated with the development of a resource or production plan within an enterprise's integration system are described in the present disclosure. In one of many embodiments, a method is described. Upon obtaining a master planning schedule, the method includes evaluating an inventory of resource associated with the master planning schedule. A production schedule associated with the master planning schedule is evaluated. Also, the method includes estimating carbon emission information associated with the master planning schedule.

22 Claims, 3 Drawing Sheets

RESOURCE PLANNING SYSTEM WITH CARBON EMISSION INPUT

TECHNICAL FIELD

The embodiments of the present disclosure generally relate to resource planning systems. More particularly, the embodiments herein relate to developing resource plans in an enterprise resource planning system or other similar integrated system of an organization.

BACKGROUND

A problem of many corporations in our present age is the focus on economic profits of the enterprise without paying attention to costs borne outside of the enterprise. Although the cost of resources used to manufacture products might be considered in a master production schedule, the amounts of carbon byproducts introduced into the environment are often disregarded. Carbon, such as in the form of carbon dioxide, is one of many pollutants that can be harmful to the environment. These pollutants are sometimes referred to as "greenhouse gases" because they trap heat that should escape from Earth's atmosphere. The natural outcome of excessive amounts of greenhouse gases being emitted into the Earth's atmosphere is the warming of the planet, which can lead to detrimental harm to the planet and its inhabitants.

Measures should be taken to reverse the current trends or the resulting global warming may continue at an alarming rate. Many environmental organizations have tried to encourage leaders of governments and corporations to preserve both economic and natural resources. In response to public concern, some leaders have proposed steps to prevent a worsening of these consequences over the next several years. Because of successful environmental awareness programs and emissions caps imposed through legislation, many corporations have made attempts to reduce greenhouse gas emission.

The Chicago Carbon Exchange ("CCX") is a trading system that recently auctioned carbon financial instrument ("CFI") contracts at the request of the United States House of Representatives. CCX is also a registry system that is voluntary to join, but legally binding once a corporation has joined. The CFI contracts encourage corporations to reduce greenhouse gas emissions through the process of trading carbon credits. Emission reductions achieved through CCX are made through a legally binding compliance regime, providing independent third party verification by the National Association of Securities Dealers ("NASD").

SUMMARY

The present disclosure describes embodiments of systems, methods, and software associated with an integration system of a corporation. According to one embodiments, a method includes obtaining a master planning schedule. Also, the method includes evaluating an inventory of resource associated with the master planning schedule. A production schedule associated with the master planning schedule is evaluated. Furthermore, the method includes estimating carbon emission information associated with the master planning schedule Other features, advantages, and implementations of the present disclosure, not expressly disclosed herein, will be apparent to one of ordinary skill in the art upon examination of the following detailed description and accompanying drawings. It is intended that such implied implementations of the present disclosure be included herein.

BRIEF DESCRIPTION OF THE DRAWINGS

The components of the following figures are illustrated to emphasize the general principles of the present disclosure. Reference characters designating corresponding components are repeated as necessary throughout the figures for the sake of consistency and clarity.

DETAILED DESCRIPTION

The present disclosure describes embodiments of systems and methods for incorporating carbon emissions data into a resource planning system ("RPS"). The RPS can be part of a system that integrates networks, databases, processes, etc., of a corporation or enterprise. Generally, such a system that integrates these different parts into one system is referred to herein as an "integration system" and may be similar in nature to an enterprise application system ("EAS"), enterprise resource planning ("ERP") system, material requirements planning or manufacturing resource planning ("MRP") system, etc.

It is a goal for many environmentally conscious corporations to reduce carbon emissions and the emission of other greenhouse gases. In order to help corporations meet these goals, the present disclosure describes ways of using a carbon emission model in a corporation's RPS or in other parts of the corporation's integration system in order that the reduction of carbon emission is considered with equal significance as other factors.

Many manufacturing companies include an integration system, such as an EAS, ERP system, MRP system, etc. for managing the processes of manufacturing. These integration systems are typically implemented as software programs and include logic for managing resources and for planning a manufacturing schedule. The resource management of such an integration system includes monitoring current inventory of supplies and materials, ensuring that the needed materials are available for production, ensuring that delivery materials are available for shipping the products, and maintaining the lowest possible level of inventory. The manufacturing schedule planning of such an integration system includes scheduling available hours of machine time and manpower. From these inventory and scheduling factors, it is possible to determine the limits of production within a manufacturing facility.

In addition to the standard information regarding materials and schedules, production planning software according to embodiments of the present disclosure further includes factors associated with the carbon footprint of each manufactured item or a group of items. This information can be used in the planning stages to account for carbon emissions. Particularly, the carbon component of the integration systems can be used to audit the amount of carbon emissions. The audit can be used in a cap and trade system, such as the Chicago Carbon Exchange ("CCX"), to determine annual carbon levels. Other implementations and advantages will become apparent to one of ordinary skill in the art from an understanding of the present disclosure.

Figure 1:
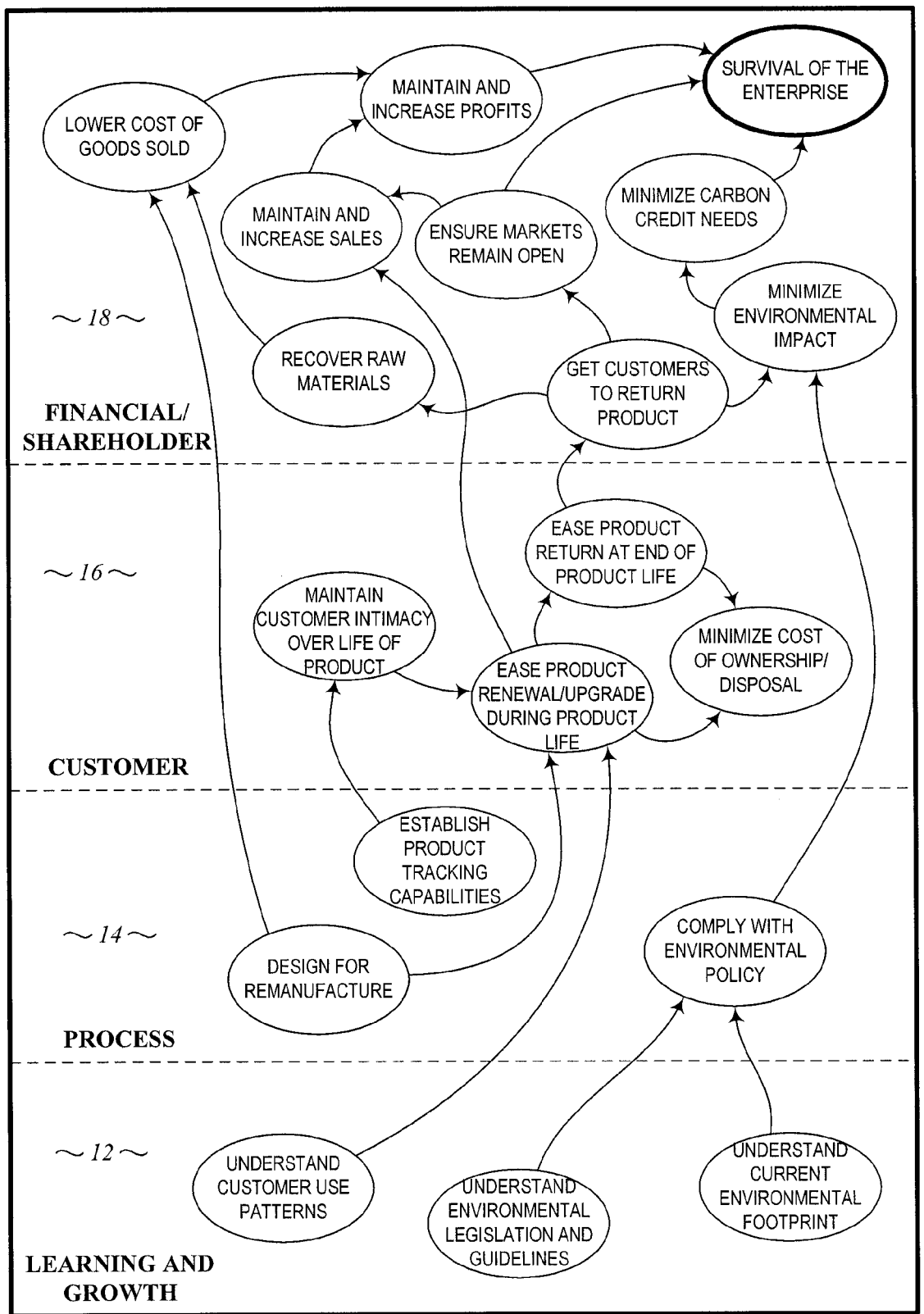
FIG. 1 is a diagram of a strategic survival map for survival of an enterprise, according to one embodiment.

FIG. 1 is a diagram illustrating an embodiment of a strategic survival map 10 for an enterprise or corporation. Generally, for an enterprise to endure, the enterprise should follow a plan for satisfying both the shareholders and customers. Strategic survival map 10 according to this embodiment shows a plan that further includes considerations of the environmental impact of the manufactured products. Strategic survival map 10 may be useful for enterprises or corporations that are also conscientious about reducing carbon emissions based on their own environmental awareness and based on current and ongoing legislation regarding emissions.

Strategic survival map 10 is based on the Kaplan model and includes a learning and growth section 12, processes section 14, customers' perspective section 16, and financial/shareholder's perspective section 18. Beyond profit objectives, strategic survival map 10 includes objectives and relationships between those objectives that show the stewardship of the company and the management of its resources. For example, learning and growth section 12 includes not only the understanding of customer use patterns, but also includes understanding about environmental legislation and guidelines and understanding the environmental footprint of manufactured products. One process 14 of the enterprise is complying with the environmental policies. In financial/shareholder's perspective section 18, minimizing the environmental impact can be beneficial to the enterprise's survival in a cap and trade system and to avoid penalties for not complying with environmental legislation. Also, with a minimized environmental footprint from the plan, the environment is not impacted as severely.

Figure 2:
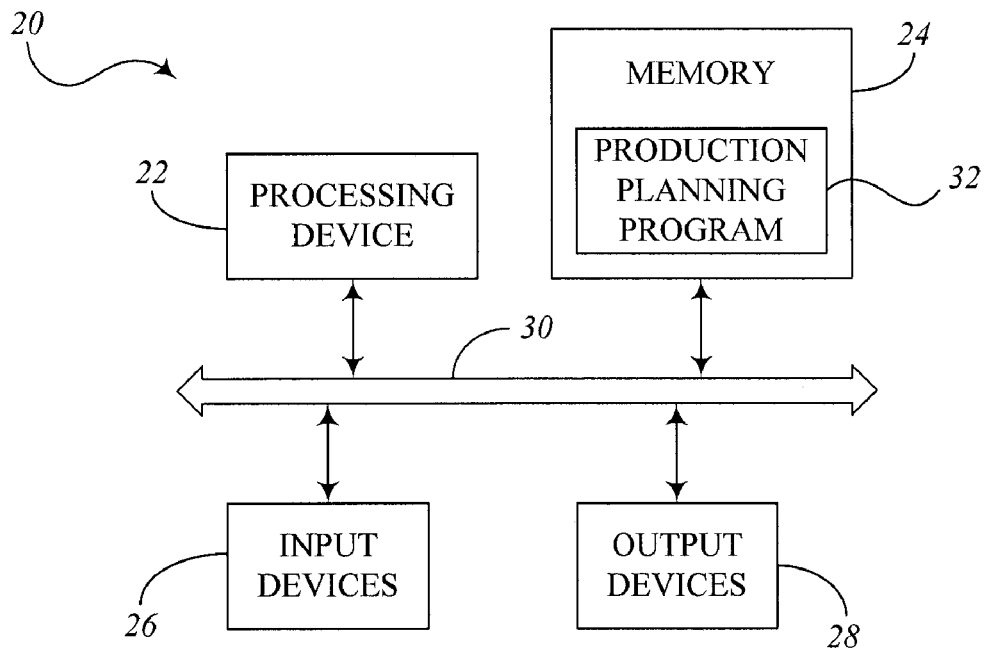
FIG. 2 is a block diagram of an integration system, according to one embodiment.

FIG. 2 is a block diagram illustrating an embodiment of a portion of an integration system 20. In this embodiment, integration system 20 includes a processing device 22, memory 24, input devices 26, and output devices 28, each interconnected via an interface bus 30. Memory 24 stores, among other things, production planning program 32, which is capable of managing production inventory and schedules. Integration system 20 may be a computer, computer network system, or the like. Processing device 22 may be a general-purpose or specific-purpose processor or microcontroller.

Memory 24 is configured to store information, data, instructions, and/or software code and may include any combination of volatile memory and/or non-volatile memory. Production planning program 32 stored in memory 24 enables processing device 22 to execute procedures related to the management of manufacturing inventories and schedules. Various logical instructions or commands may be included in production planning program 32. Concerning various embodiments, production planning program 32 can be implemented in hardware, software, firmware, or a combination thereof. When implemented in software or firmware, production planning program 32 is stored in memory 24 and executed by processing device 22. When implemented in hardware, production planning program 32 can be configured within processing device 22 using discrete logic circuitry, an application specific integrated circuit ("ASIC"), a programmable gate array ("PGA"), a field programmable gate array ("FPGA"), etc., or any combination thereof.

As described herein, production planning program 32, and any other software, programs, or computer code stored in memory 24, may include executable logical instructions that is embodied in computer-readable media for execution by any suitable processing device, such as processing device 22. The computer-readable media can include one or more suitable physical media components that can store the software, programs, or computer code for a measurable length of time.

In operation, production planning program 32 may be configured to perform production planning and inventory control, manage manufacturing processes, maintain bill of materials information, ensure that materials are available for production and delivery, maintain the lowest reasonable level of inventory, plan manufacturing activities and delivery schedules, manage consumer demand information and trends, maintain market information regarding different products, maintain shelf life information regarding different products, evaluate manpower, etc. In addition, production planning program 32 is further configured to maintain information regarding carbon emission of each of the different products manufactured at the respective facility. The carbon emission information can be used to determine the carbon footprint of each product.

Input devices 26 may include any suitable input mechanisms such as keyboards, keypads, cursor control devices, etc. In some embodiments, input devices 26 may include interfaces for communicating with other devices via various networks. Generally, information related to production or manufacturing processes can be entered into Integration system 20 via input devices 26. Some data related to manufacturing may be obtained automatically via input devices 26.

Output devices 28 may include any suitable output mechanisms for communicating information to a user, administrator, etc. Output devices 28 may include, for example, computer monitors, audio output devices, printers, etc. Production planning program 32 may be configured to determine purchase orders that are to be provided to a supplier. In this case, the purchase orders can be output on output devices 28. Based on other activity by production planning program 32, output devices 28 may provide, present, or display various information, such as production schedules, quantities of materials needed for production, and the start and completion dates of production. Output devices 28 may also provide purchasing schedule information defining the dates when certain materials should be received for production.

Production planning program 32 is configured to maintain a bill of resources or bill of materials database. According to the embodiments of the present disclosure, carbon emission can be included in the bill of resources. Thus, the bill of resources can include resources used in the manufacture of the products and furthermore includes the emission of carbon or other greenhouse gases as a manufacturing factor to be considered. Just as materials, machines, and manpower are typical variables in the equation to determine the manufacturing limitations, the carbon emission is now also added as a variable into the equation for constraining the manufacturing to within the carbon emission guidelines or caps.

Estimations of carbon output during manufacture and during the life of the product are used in the planning stages of development and production and are considered according to production planning program 32 as a constraining factor. The enterprise or corporation can simulate the carbon footprint of each manufactured item, which can be used in a resource plan or master planning schedule of a corporation's integration system.

Auditing of the environmental impact of production usually falls in the hands of the corporation itself. As carbon limits and the limits of other pollutants become a reality in the commercial domain, environmental responsibility becomes vital for market access. As a result, the very survival of the enterprise is based on having processes and controls that meet the environmental objectives. Audit committees within an enterprise or third party auditors need to be engaged and demanding of management that the correct risks are being responded to and adequate controls are in place.

Figure 3:
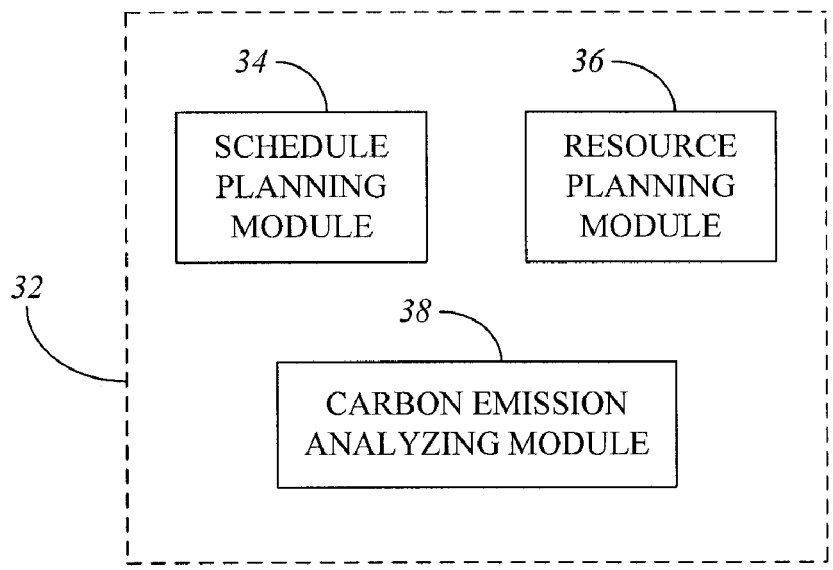
FIG. 3 is a block diagram of the production planning program shown in FIG. 2, according to one embodiment.

FIG. 3 is a block diagram illustrating an embodiment of production planning program 32 shown in FIG. 2. According to the embodiment of FIG. 3, production planning program 32 includes a schedule planning module 34, a resource planning module 36, and a carbon emission analyzing module 38. Schedule planning module 34 includes various planning logic and/or algorithms for managing a purchase schedule, production schedule, testing procedures, and quality controls. Resource planning module 36 includes various planning logic and/or algorithms for managing materials, supplies, machine availability, manpower availability, and supplier capacity information.

Carbon emission analyzing module 38 maintains information regarding the emission of carbon. In some embodiments, carbon emission analyzing module 38 analyzes carbon emission during the entire manufacturing process of each product. Within the scope of the manufacturing process is the process's impact on the environment. The manufacturing process, for example, can include the environmental impact of obtaining resources and materials, the actual production and packaging activities, and delivery of the products to retailers or customers. In some embodiments, information maintained in carbon emission analyzing module 38 can includes the emission of not only carbon but also other pollutants or greenhouse gases. Also, estimations can be based on disposal patterns and may include residual raw materials at the end of the product's lifetime.

An enterprise may utilize production planning program 32 to set its internal targets for carbon emissions and to monitor its annual carbon footprint. Based on a certain annual carbon cap, the enterprise can set its targets at a level below the cap and align its production according to times during the year when carbon emissions are reported. In this respect, production planning program 32 can be used to keep the enterprise on track to meet its carbon emission goals. Production planning program 32 can also help to optimize the enterprise's master production schedule by allowing production that will not exceed the carbon cap and will not greatly vary from the internal carbon emission estimates.

Figure 4:
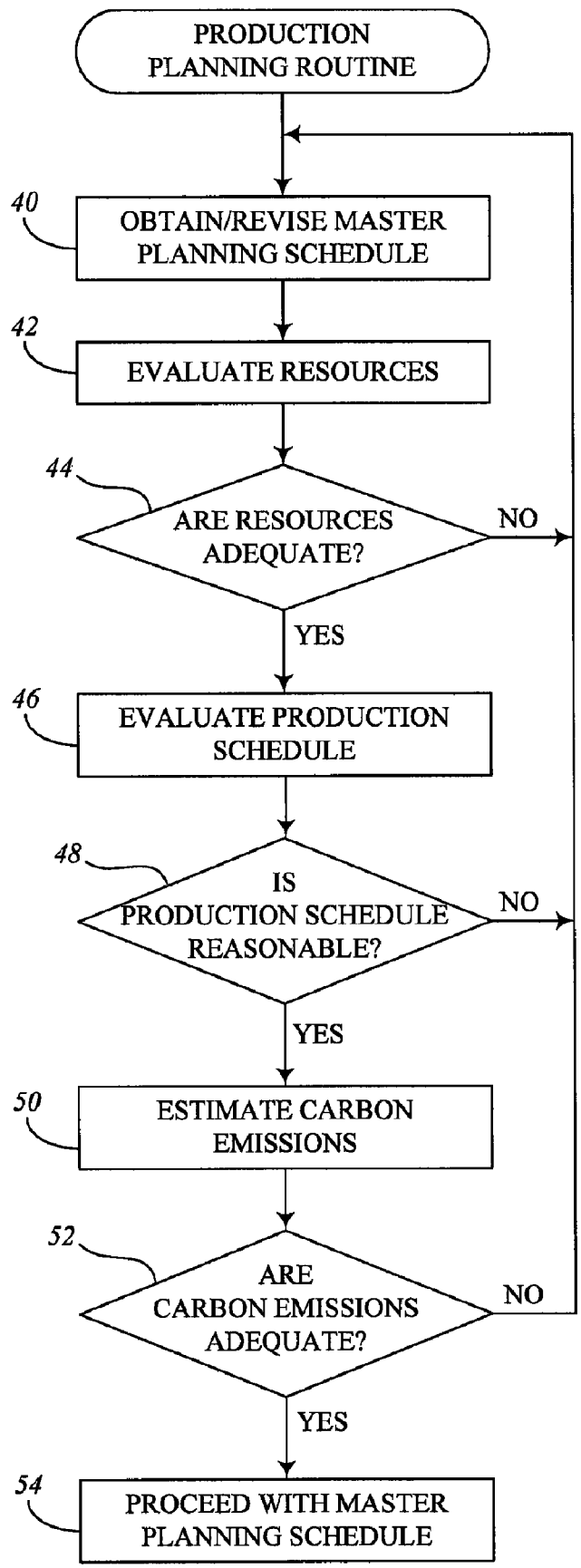
FIG. 4 is a flow diagram of a method for executing a master planning schedule, according to one embodiment.

FIG. 4 is a flow diagram illustrating an embodiment of a method for incorporating carbon emission data into a corporation's integration system, such as the corporation's EAS. As indicated in block 40, a master planning schedule is obtained. If necessary, the master planning schedule can be revised based on further analysis, as described below. The master planning schedule may include plans for obtaining resources, plans for the scheduling of production, and information and/or estimations of carbon emissions.

As indicated in block 42, the current inventory of resources, such as materials and supplies, is evaluated. It is then determined whether the current inventory of the resources is adequate, as indicated in decision block 44. The amount needed may be based on the current production schedule and the expectation of incoming resources from suppliers. If it is determined that the resources are not adequate, the flow proceeds to block 40 for revising the master planning schedule.

If the resources are adequate, the flow diagram proceeds to block 46, which indicates that the production schedule is evaluated. The evaluation of the production schedule may include determining the availability of machines and manpower to meet production goals over a certain time period. As indicated in decision block 48, it is determined whether the evaluated production schedule is reasonable, based on the various availability limitations on production. If the production schedule is not reasonable or not possible, the flow diagram returns back to block 40 and the master planning schedule is revised. If the production schedule is reasonable, the flow continues to block 50.

As indicated in block 50, a product's carbon emission information is estimated. The estimations can be based on historical data of carbon emission during manufacture as well as other factors that correlate the product's usage and disposal to carbon emissions. As indicated in decision block 52, it is determined whether or not the estimations of carbon emissions for the product adequately meet environmental laws, guidelines, or goals. If the estimate carbon emissions are not within environmental goals, the flow diagram loops back to block 40 and the master planning schedule is revised in order to determine a strategy to reduce carbon emissions to meet the environmental goals.

If it is determine in block 52 that the carbon emission estimates are adequately within the proper guidelines, then the flow diagram continues to block 54. As indicated in block 54, the corporation or enterprise can proceed with the master planning schedule. In some instances, the master planning schedule may be revised as necessary to conform to resource requirements, production schedule requirements, and carbon emission requirements.

It should be understood that the steps, processes, or operations described herein may represent any module or code sequence that can be implemented in software or firmware. In this regard, these modules and code sequences can include commands or instructions for executing specific logical steps, processes, or operations within physical components. It should further be understood that one or more of the steps, processes, and/or operations described herein may be executed substantially simultaneously or in a different order than explicitly described, as would be understood by one of ordinary skill in the art.

The embodiments described herein represent a number of implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

I claim:

1. An integration system comprising:
a processing device; and
memory configured to store a production planning program, wherein the production planning program plans a production process for manufacturing a product and comprises a master planning schedule comprising plans for obtaining resources and plans for scheduling production;
wherein the processing device is configured to execute the production planning program stored in memory to:
manage schedule planning information associated with schedules for the manufacturing of the product, wherein the schedules comprise a purchase schedule and production schedule for the manufacturing of the product;
manage resource planning information associated with an inventory of resources for the manufacturing of the product; and
estimate carbon emission information associated with the manufacturing of the product, wherein the carbon emission information is based on at least a first amount of carbon emission based on the manufacturing of the product, a second amount of carbon emission based on a usage of the product, and a third amount of carbon emission based on a disposal of the product;
compare the estimate to a predefined level of carbon emission for the manufacturing of the product, and adjust the master schedule when the estimate exceeds the predefined level, wherein the adjust comprises revising resource requirements for manufacturing the product and revising production schedules for manufacturing the product.

2. The integration system of claim 1, further comprising input devices configured to obtain information associated with an updated inventory of the resources for the manufacturing of the product.

3. The integration system of claim 1, further comprising output devices configured to present information to an administrator.

4. The integration system of claim 3, wherein the information presented to the administrator is the production schedule, the production schedule including quantities of resources to be used for the manufacturing of the product and production start and completion dates.

5. The integration system of claim 3, wherein the information presented to the administrator is the purchasing schedule, the purchasing schedule including dates that materials are to be received from a supplier.

6. The integration system of claim 1, wherein the carbon emission estimates are based on historical values.

7. The integration system of claim 1, wherein the carbon emission estimates are incorporated in a bill of resources associated with the resource planning information.

8. The integration system of claim 1, wherein the processing device is further configured to compare the carbon emission estimates with a carbon cap and to adjust the master planning schedule when the carbon emission estimates exceed the carbon cap.

9. A production planning program stored in memory and executed by a processing device, the production planning program comprising:
    schedule planning logic configured to plan a master planning schedule of manufacturing of a product, the master planning schedule comprising plans for obtaining resources and plans for scheduling production and comprising a purchase schedule and production schedule for the manufacturing of the product;
    resource planning logic configured to plan an inventory of resources for the manufacturing of the product; and
    carbon emission analyzing logic configured to analyze carbon emissions information related to the manufacturing of the product, wherein the analyze carbon emissions is based on at least a first amount of carbon emission based on the manufacturing of the product, a second amount of carbon emission based on a usage of the product, and a third amount of carbon emission based on a disposal of the product, and
    the analyze carbon emissions comprises compare an estimate of carbon emission for the manufacturing of the product with a predefined level of carbon emission for the manufacturing of the product, and adjust the master schedule when the estimate exceeds the predefined level, wherein the adjust comprises revising resource requirements for manufacturing the product and revising production schedules for manufacturing the product.

10. The production planning program of claim 9, wherein the schedule planning logic includes purchase schedule logic configured to schedule purchases of resources from a supplier.

11. The production planning program of claim 9, wherein the schedule planning logic includes production schedule logic configured to schedule production, testing, and quality control activities.

12. The production planning program of claim 9, wherein the resource planning logic includes availability logic configured to determine the availability of machine and manpower for supporting the manufacturing of the product.

13. The production planning program of claim 9, wherein the carbon emission analyzing logic includes energy analyzing logic configured to obtain information related to the energy applied toward the manufacturing of the product.

14. The production planning program of claim 13, wherein the energy analyzing logic is further configured to obtain information related to the energy applied toward obtaining resources.

15. The production planning program of claim 13, wherein the energy analyzing logic is further configured to obtain information related to the energy applied toward delivering the product to a retailer.

16. The production planning program of claim 13, wherein the energy analyzing logic is further configured to obtain information related to the energy applied toward the recycling or disposal of the product at the end of the product's lifetime.

17. The production planning program of claim 9, wherein the carbon emissions analyzing logic is further configured to determine an estimate of annual carbon emissions of an enterprise and to enable modification of the master planning schedule when the estimate exceeds a carbon cap.

18. A method comprising:
    obtaining a master planning schedule comprising plans for obtaining resources and plans for scheduling production and comprises a purchase schedule and a production schedule for the manufacturing of the product
    evaluating, by a processor, an inventory of resource associated with the master planning schedule;
    evaluating, by the processor, the production schedule associated with the master planning schedule;
    estimating, by the processor, carbon emission information associated with master planning schedule, wherein the carbon emission information is based on at least a first amount of carbon emission based on the manufacturing of the product, a second amount of carbon emission based on a usage of the product, and a third amount of carbon emission based on a disposal of the product; and
    comparing the estimate to a predefined level of carbon emission for the manufacturing of the product, and adjusting the master schedule when the estimate exceeds the predefined level, wherein the adjusting comprises revising resource requirements for manufacturing the product and revising production schedules for manufacturing the product.

19. The method of claim 18, further comprising:
    determining whether the inventory of resources is adequate; and
    revising the master planning schedule when it is determined that the inventory of resources is inadequate.

20. The method of claim 18, further comprising:
    determining whether the production schedule is reasonable; and
    revising the master planning schedule when it is determined that the production schedule is not reasonable.

21. The method of claim 18, further comprising:
    determining whether the carbon emission estimate meets environmental guidelines; and
    revising the master planning schedule when it is determined that the carbon emission estimate exceeds a carbon cap.

22. The method of claim 18, further comprising:
    determining whether the carbon emission estimate meets a carbon limit set by an enterprise; and
    revising the master planning schedule when it is determined that the carbon emission estimate exceeds the carbon limit.

* * * * *

UNITED STATES PATENT AND TRADEMARK OFFICE
CERTIFICATE OF CORRECTION

| | | |
|---|---|---|
| PATENT NO. | : 8,214,249 B2 | Page 1 of 1 |
| APPLICATION NO. | : 12/135767 | |
| DATED | : July 3, 2012 | |
| INVENTOR(S) | : King | |

It is certified that error appears in the above-identified patent and that said Letters Patent is hereby corrected as shown below:

On the Title page, Item 56, under "Other Publications", line 3, delete "Edinbugh" and insert -- Edinburgh --, therefor.

On Title page 2, Item 56, under "Other Publications", line 22, delete "Exhange, Inc.," and insert -- Exchange Inc., --, therefor.

In column 1, line 62-63, delete "schedule" and insert -- schedule. --, therefor.

Signed and Sealed this
Twenty-fifth Day of September, 2012

David J. Kappos
*Director of the United States Patent and Trademark Office*